United States Patent [19]
Libbey et al.

[11] 3,927,059
[45] Dec. 16, 1975

[54] METHOD OF PRODUCING DIALKYLDIFLUOROSILANE COMPOUNDS

[75] Inventors: William J. Libbey; Allan J. Lundeen, both of Ponca City, Okla.

[73] Assignee: Continental Oil Company, Ponca City, Okla.

[22] Filed: Feb. 10, 1975

[21] Appl. No.: 548,858

Related U.S. Application Data

[63] Continuation-in-part of Ser. No. 431,181, Jan. 7, 1974, abandoned, which is a continuation of Ser. No. 235,002, March 15, 1972, abandoned.

[52] U.S. Cl. .................. 260/448.2 E; 260/448.8 R
[51] Int. Cl.² ..................... C07F 7/08; C07F 7/12
[58] Field of Search ........................... 260/448.2 E

[56] References Cited
UNITED STATES PATENTS

| | | | |
|---|---|---|---|
| 2,895,977 | 7/1959 | Fitch | 260/448.2 E |
| 2,921,951 | 1/1960 | Jenkner | 260/448.2 E |
| 3,621,045 | 11/1971 | Muller et al. | 260/448.2 E |

FOREIGN PATENTS OR APPLICATIONS

| | | | |
|---|---|---|---|
| 948,975 | 9/1956 | Germany | 260/448.2 E |
| 972,855 | 10/1959 | Germany | 260/448.2 E |
| 756,612 | 9/1956 | United Kingdom | 260/448.2 E |

Primary Examiner—Paul F. Shaver

[57] ABSTRACT

Dialkyldifluorosilane compounds can readily be produced by a two step process wherein the first step involves the formation of an alkyltrifluorosilane compound from the reaction of an organo-aluminum compound with silicon tetrafluoride and then reacting the alkyltrifluorosilane compound with an organo-aluminum compound to produce a reaction mixture containing the desired dialkyldifluorosilane compounds.

7 Claims, No Drawings

METHOD OF PRODUCING DIALKYLDIFLUOROSILANE COMPOUNDS

This is a continuation-in-part of Ser. No. 431,181, filed Jan. 7, 1974, now abandoned, which in turn was a continuation of Ser. No. 235,002, filed Mar. 15, 1972, now abandoned.

This invention relates to a method for producing dialkyldifluorosilane compounds in which the two alkyl groups can be either the same alkyl group or different alkyl groups.

Organo-silicon halides, for example methyl silicon chlorides, have been manufactured commercially by the use of Grignard reagents, or elemental silicon plus alkyl chlorides in the presence of a copper catalyst. These processes have several disadvantages particularly with reference to the economics of the use of catalysts and reagents. Other methods have been proposed for the production of organic silicon compounds such as disclosed in British Pat. No. 756,612 wherein aluminum triethyl is reacted with a compound containing silicon and fluorine wherein the fluorine atom is directly bonded to the silicon atom. In such a process the product formed has been reported to contain a mixture of the alkyltrifluorosilane compound, the dialkyldifluorosilane compound, the trialkylfluorosilane compound, and the tetraalkylsilane compound.

In the production of silicon compounds by the hydrolysis and condensation of the alkyl halosilane compounds the presence of the trialkyl monohalosilane compounds and the tetraalkylsilane compounds are not desired and, thus, it is desirable to provide a method for producing dialkyldifluorosilane compounds and/or alkyltrifluorosilane compounds in high yield and good selectivity which can readily be recovered in a substantially pure form without the presence of the undesired trialkylmonohalosilane compounds and the tetraalkylsilane compounds. Further, it is desirable to provide a method for producing dialkyldifluorosilane compounds in which the alkyl groups present in such compounds can be chosen to fit a particular purpose.

According to the invention it has been discovered that dialkyldifluorosilane compounds can be produced in excellent yields while substantially maintaining or increasing selectivity, and that the alkyl constituent of the dialkyldifluorosilane compounds can either be the same alkyl radical or different alkyl radicals containing different carbon atom lengths. Broadly, this is accomplished by a two step process wherein the first step involves the reaction of an aluminum alkyl complex wherein the aluminum alkyl has the general formula $Al(R)_3$, each R being an alkyl group containing from 3 to about 20 carbon atoms, with a molar excess of $SiF_4$. The resulting product, which is primarily an alkyltrifluorosilane compound, is then reacted with either an aluminum alkyl having the general formula $Al(R')_3$, each R' being an alkyl group containing from about 2 to about 20 carbon atoms, or a complex of that aluminum alkyl to produce a reaction mixture containing predominantly dialkyldifluorosilane compounds and unreacted alkyltrifluorosilane compounds. The dialkyldifluorosilane compounds are then separated from the alkyltrifluorosilane compounds and the unreacted alkyltrifluorosilane compounds can be recycled to produce the desired dialkyldifluorosilane compounds. The product dialkyldifluorosilane compounds, upon hydrolysis and condensation, yield silicone products which are useful as lubricants and water repellents and other well-known utilities.

In the first step an alkyltrifluorosilane compound is produced by the reaction of an aluminum alkyl complex wherein the aluminum alkyl has the general formula $Al(R)_3$, each R being an alkyl group containing about 3 to about 20 carbon atoms, with a molar excess of silicon tetrafluoride. The reaction conditions for this first step can vary broadly both as to temperature and pressure. However, desirable results have been obtained when the reaction is carried out at a temperature in the range of from about 25° to about 300°C, preferably from about 100° to 225°C. Employing temperatures much below about 25°C results in impractically slow reaction rates. Temperatures above about 300°C may be used provided that degradation is avoided. Pressures are not critical in the process, practicality being the primary consideration. In general, pressures in the range of about atmospheric to about 3000 psi may be used, preferably 100 to about 1000 psi.

The first step may be carried out in either a batchwise or continuous manner as will be recognized by those skilled in the art.

In carrying out the first step of the process of the invention, the amount of silicon tetrafluoride relative to the aluminum alkyl content of the complex can vary considerably provided that the molar ratio of the silicon tetrafluoride to the aluminum alkyl content is at least 3. Desirable results have been obtained wherein the molar ratio of the silicon tetrafluoride to the aluminum alkyl content of the complex is in the range of from about 3:1 to about 6:1.

The aluminum alkyl complex used in the first step of the process is formed by the addition of a complexing agent to the aluminum alkyl. The aluminum alkyl, as hereinbefore noted, has the formula $Al(R)_3$ wherein each R is an alkyl group containing 3 to about 20 carbon atoms. The lower limits of the chain length of the alkyl radical is important if one is to obtain a high selectivity to the formation of the desired alkyltrifluorosilane compounds. Evidence of the importance of the lower limit of chain length of the alkyl radical can be seen by reviewing British Pat. No. 756,612 which teaches that when aluminum triethyl, $Al(C_2H_5)_3$, is reacted with compounds containing silicon and fluorine such as $SiF_4$ a product is formed which contains a major portion of tetraethylsilane and diethyldifluorosilane. However, when using the aluminum alkyl wherein the alkyl groups contained at least 3 carbon atoms the major product formed is alkyltrifluorosilane. The upper limit of the chain length of the alkyl radical is limited only by practicality. Thus, under normal conditions the chain length of the alkyl radical of the aluminum alkyl compound would range from 3 to about 20 carbon atoms. However, especially desirable results have been obtained wherein R contains from 4 to about 12 carbon atoms. The alkyl groups may be straight chain or may be branched at any position other than the alpha position. Examples of suitable aluminum alkyls are aluminum tripropyl, aluminum tributyl, aluminum trihexyl, aluminum trioctyl, aluminum tridecyl, aluminum tridodecyl, aluminum tritetradecyl, aluminum trihexadecyl, aluminum trioctadecyl, aluminum trieicosyl, aluminum triisobutyl, aluminum tri-2-ethylhexyl and the like.

The complexing agent may be tetrahydrofuran; m-dioxane; p-dioxane; triethylenediamine; quinoline; isoquinoline; aliphatic amines having the formula

wherein each A is a straight chain alkyl group having 1 to 6 carbon atoms; or cyclic amines of the formula

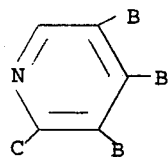

wherein each B is hydrogen or an alkyl group having 1 to 10 carbon atoms provided that any two adjacent B groups together with the nuclear carbon atoms to which they are attached may represent a single ring having 5 to 7 carbon atoms, and C is hydrogen or methyl.

The reaction resulting from the addition of the complexing agent to the aluminum alkyl is exothermic and for safety reasons the complexing agent is added to the aluminum alkyl at room temperature using agitation and suitable cooling means. The reaction also is carried out in an anhydrous, oxygen-free atmosphere.

The amount of complexing agents added to the aluminum trialkyl to form the aluminum trialkyl complex can vary widely. Desirable results have, however, been obtained where the amount of complexing agent employed varies in a molar ratio with the aluminum trialkyl from about 0.4:1 to about 3:1. Especially desirable results have been obtained wherein the molar ratio of the complexing agent to the aluminum trialkyl is about 1:1.

The time factor for the reaction of the aluminum trialkyl complex with the silicon tetrafluorine can vary widely at the reaction conditions set forth hereinbefore. However, the time factor will be dependent to some extent on the temperature and pressure at which the reaction takes place. Generally the reaction period ranges from about 1 to about 4 hours, preferably from about 1½ hours to 3 hours. Further, the temperature of the reaction can be adjusted upwardly in increments during this period of time to allow one more control over the reaction.

Once the alkyltrifluorosilane has been produced by the first step of the invention it is employed as one of the starting materials for the second step in the production of the dialkyldifluorosilane compound. It is not necessary to separate the alkyltrifluorosilane compound from the reaction mixture but rather can use the total mixture as the starting materials in the second step of the present process. However, when a dialkyldifluorosilane compound having a high purity is desired one may separate the alkyltrifluorosilane compounds from the reaction product mixture of the first step. When such a separation is desirable such can readily be accomplished by means which are well known in the art such as fractional distillation, solvent extraction, and the like.

The alkyltrifluorosilane compounds produced above can be represented by the general formula $RSiF_3$ wherein R corresponds to the alkyl groups of the aluminum alkyl.

The second step of the process for the production of the dialkyldifluorosilane compounds by the present invention involves the reaction of the alkyltrifluorosilane compounds produced in the first step with an aluminum trialkyl or an aluminum trialkyl complex.

The aluminum trialkyl suitable for the second step of the process is defined by the general formula $Al(R')_3$ wherein each R' is an alkyl group containing from 2 to 20 carbon atoms. The upper limit of the chain lengths of the alkyl radical of the aluminum trialkyl compound is limited only by practicality. However, especially desirable results have been obtained wherein the alkyl radicals have from 2 to about 12 carbon atoms. Further, the alkyl constituent may be a straight chain or a branched chain radical provided that the branching is at any position other than the alpha position. Examples of suitable aluminum trialkyls for use in the second step of the process for the preparation of dialkyldifluorosilane compounds by the present invention are aluminum triethyl, aluminum tripropyl, aluminum tributyl, aluminum trihexyl, aluminum trioctyl, aluminum tridecyl, aluminum tridodecyl, aluminum tritetradecyl, aluminum trihexadecyl, aluminum trioctadecyl, aluminum trieicosyl, aluminum triisobutyl, aluminum tri-2-ethylhexyl, and the like.

The aluminum trialkyl complexes suitable for use in the second step of the process are complexes of the above described aluminum trialkyls and a complexing agent which is the same as those described with regard to the first step. Preparation of these complexes is as described in the first step again using a molar ratio of complexing agent to aluminum alkyl in the range of about 0.4:1 to about 3:1.

Further, it should be evident to those skilled in the art that if one desires to produce a dialkyldifluorosilane compound having the general formula $RR'F_2Si$ wherein R and R' are as defined hereinbefore and wherein the alkyl radicals are of different chain lengths then one will select the desired aluminum trialkyl or complex thereof for the reaction in the second step based upon the alkyl radicals present in the intermediate product, the alkyltrifluorosilane compound.

The reaction conditions for the production of the dialkyldifluorosilane compound from the alkyltrifluorosilane compound and the aluminum trialkyl or aluminum trialkyl complex as previously discussed can vary broadly both as to temperature and pressure. However, desirable results have been obtained when the reaction is carried out at a temperature in the range of from about 180° to about 300°C and at a pressure in the range of from about atmospheric to about 3000 psi. Especially desirable results have been obtained wherein the reaction temperature is in the range of from about 200° to about 260°C, at a pressure within the range of from about 100 to about 1000 psi.

Since aluminum trialkyls are involved in the second step of the process for the production of the dialkyldifluorosilane compounds, the reaction should be carried out in the absence of moisture and oxygen. Thus, it has been found advantageous to carry out the reaction in an anhydrous inert atmosphere employing inert gases such as argon, nitrogen, mixtures of same and the like.

In the conversion of the alkyltrifluorosilane compounds produced by the first step of the present invention by the second step of this invention the amount of aluminum trialkyl and/or aluminum trialkyl complexes to the alkyltrifluorosilane compounds can vary widely, but the molar ratio of the aluminum trialkyl and/or aluminum trialkyl contained in the complex to the alkyltrifluorosilane compound will generally be within the range of from about 0.25:1 to 1:1. Desirable results have been obtained wherein the molar ratio of the aluminum trialkyl and/or aluminum trialkyl contained in the complex to the alkyltrifluorosilane compound is in the range of from about 0.35:1 to 0.7:1.

Once the desired reaction has taken place a reaction product is obtained which contains a majority of the desired dialkyldifluorosilane compounds and a minor amount of alkyltrifluorosilane compounds. The desired product can readily be separated from the mixture by means which are well known in the art, such as fractional distillation. The separated unreacted alkyltrifluorosilane compound can then be recycled for use as the reactant in the second step of the process of the present invention.

In order to more fully describe the present invention the following examples are given. However, it is to be understood that these examples are for illustrious purposes only and are not intended to unduly limit the scope of the present invention. In each example the percentages are weight percentages unless otherwise specified.

EXAMPLE I

A series of experiments were conducted on the first step of the present process, namely on the production of the alkyltrifluorosilane compounds. Experiments (1) and (2) demonstrate the first step of the process of the invention whereas experiment (3) was performed without the use of a complexing agent.

1. A 100 ml stainless steel autoclave was charged with 10.75 g (0.039 moles) of a 1:1 molar complex of aluminum tributyl and pyridine and 18.5 (0.178 moles) of $SiF_4$. The reaction was run under an argon atmosphere with stirring. The autoclave was heated for 1 hour at 125°C and an additional 1.25 hours at 145°C. The light yellow liquid product weighed 15.0 g and had the following composition by GC analysis (peak areas):

| | |
|---|---|
| n-butane | 1.2% |
| $C_4H_9SiF_3$ | 98.6% |
| $(C_4H_9)_2SiF_2$ | 0.1% |
| $(C_4H_9)_3SiF$ | 0 |
| Others | 0.1% |

The percent conversion of aluminum tributyl complex to $C_4H_9SiF_3$ was 96%.

2. The experimental procedure for this reaction and subsequent examples are the same as detailed in Experiment I, above; thus, only quantities used and results are noted.

The reaction of 9.2 g (0.0207 moles) of a 1:1 molar complex of aluminum trioctyl and pyridine and 7.7 g (0.074 moles) of $SiF_4$ was carried out at 125°C for 1.0 hours and at 145°C for an additional 1.25 hours. The liquid product weighed 8.6 g and had the following composition (GC - peak areas):

| | |
|---|---|
| n-octane + octenes | 12.5% |
| $C_8H_{17}SiF_3$ | 85.1% |
| $(C_8H_{17})_2SiF_2$ | 0 |
| $(C_8H_{17})_3SiF$ | 0 |
| Others | 2.5% |

The percent conversion of the aluminum trioctyl complex to $C_8H_{17}SiF_3$ was 74%.

3. A 100 ml stainless steel autoclave was charged with 7.3 g (0.037 moles) of aluminum tributyl and 14.9 g (0.143 moles) of $SiF_4$. The reaction was run under an argon atmosphere with stirring. The autoclave was heated for 20 minutes at 125°C, for 1 hour at 145°C and for an additional hour at 255°C. The liquid product weighed 9 g and was analytically determined to have the following composition (GC - peak areas):

| | |
|---|---|
| butane + butene | 3.9% |
| $C_4H_9SiF_3$ | 81.4% |
| $(C_4H_9)_2SiF_2$ | 6.1% |
| $(C_4H_9)_3SiF$ | 2.3% |
| Others | 6.3% |

The percent conversion of the aluminum tributyl to $C_4H_9SiF_3$ was 63%.

Butyltrifluorosilane and octyltrifluorosilane were separated by distillation from the above reaction products. The purified butyltrifluorosilane and octyltrifluorosilane were then employed as reactants in carrying out the second step of the process for the production of the desired dialkyldifluorosilane compounds. The second step is illustrated by the following examples.

EXAMPLE II

A 100 ml stainless steel autoclave was charged with 10.36 g (0.073 moles) of $C_4H_9SiF_3$ and 3.44 g (0.030 moles) of aluminum triethyl. The reaction was run under an argon atmosphere with stirring. The autoclave was heated for 3 hours at 200°C. Distillation of the product gave 10.5 g of a clear, colorless liquid which upon GC analysis (peak areas) was found to contain the following composition:

| | |
|---|---|
| $C_4H_9SiF_3$ | 16.4% |
| $(C_4H_9)(C_2H_5)SiF_2$ | 73.0% |
| $(C_4H_9)(C_2H_5)_2SiF$ | 5.3% |
| $C_4H_9Si(C_2H_5)_3$ | 2.3% |
| Others | 3.0% |

The conversion of $C_4H_9SiF_3$ to $C_4H_9(C_2H_5)SiF_2$ was 74%.

EXAMPLE III

The reaction was run precisely as described above in Example II except 18.2 g (0.092 moles) of $C_8H_{17}SiF_3$ and 3.54 g (0.031 moles) of aluminum triethyl were used. The product GC analysis (peak areas) was the following:

| | |
|---|---|
| $C_8H_{17}SiF_3$ | 20.0% |
| $(C_8H_{17})(C_2H_5)SiF_2$ | 68.8% |
| $(C_8H_{17})(C_2H_5)_2SiF$ | 5.0% |
| $(C_8H_{17})Si(C_2H_5)_3$ | 2.1% |
| Others | 3.9% |

The conversion of $C_8H_{17}SiF_3$ to $C_8H_{17}(C_2H_5)SiF_2$ was 72%.

EXAMPLE IV

A 100 ml stainless steel autoclave was charged with 14.29 g (0.10 moles) of $C_4H_9SiF_3$ and 8.95 g (0.047 moles) of a 1:1 molar complex of aluminum triethyl and pyridine. The autoclave was heated with stirring for 1 hour at 150°C and 2.5 hours at 200°C. Distillation of the product gave 14.9 g of a liquid. GC analysis (peak areas) of the product revealed the following composition:

| | |
|---|---|
| Hydrocarbons | 1.3% |
| $C_4H_9SiF_3$ | 34.5% |
| $(C_4H_9)(C_2H_5)SiF_2$ | 50.1% |
| $(C_4H_9)(C_2H_5)_2SiF+(C_4H_9)Si(C_2H_5)_3$ | 3.9% |
| Others | 1.7% |
| Pyridine | 8.4% |

The conversion of $C_4H_9SiF_3$ to $C_4H_9(C_2H_5)SiF_2$ was 58%.

EXAMPLE V

The autoclave was charged with 7.6 g (0.053 moles) butyltrifluorosilane and 17.1 g (0.062 moles) of a 1:1 molar complex of aluminum tributyl and pyridine. The autoclave was heated for 1 hour at 130°C and 1 hour at 150°C. GC analysis (peak areas) of the liquid product gave the following product distribution:

| | |
|---|---|
| Hydrocarbons | 14.7% |
| $C_4H_9SiF_3$ | 19.4% |
| $(C_4H_9)_2SiF_2$ | 27.5% |
| $(C_4H_9)_3SiF$ | 2.5% |
| Others | 3.2% |
| Pyridine | 32.8% |

Due to the low temperatures employed the conversion of $C_4H_9SiF_3$ to $(C_4H_9)_2SiF_2$ was 57%.

EXAMPLE VI

The autoclave was charged with 14.65 g (0.102 moles) of $C_4H_9SiF_3$ and 6.15 g (0.031 moles) of aluminum tributyl. The autoclave was heated for 0.5 hours at 130°C, 1 hour at 150°C, and 1 hour at 200°C. GC analysis of the liquid product gave the following product distillation (peak areas):

| | |
|---|---|
| $C_4$ Hydrocarbons | 10.6% |
| $C_4H_9SiF_3$ | 42.7% |
| $(C_4H_9)_2SiF_2$ | 31.4% |
| $(C_4H_9)_3SiF$ | 4.0% |
| $(C_4H_9)_3SiH$ | 5.5% |
| Others | 5.8% |

EXAMPLE VII

The invention is further demonstrated by employing the procedure of Example I (1) modified to use a 2:1 molar complex of tetrahydrofuran and aluminum tridecyl to form the intermediate reaction product predominantly of decyltrifluorosilane. Using the procedure of Example IV, this intermediate reaction product is then subjected to further reaction with either aluminum trioctyl or a 1:1 molar complex of isoquinoline and aluminum trioctyl to produce decyl(octyl)difluorosilane, the mole ratio of decyltrifluorosilane to the aluminum trioctyl being 1/0.5.

EXAMPLE VIII

The invention is further deomonstrated by following the procedure of Example VII wherein, in the first step, a 3:1 molar complex of complexing agent to aluminum tripentadecyl, aluminum tritetradecyl or aluminum trihexadecyl is employed, the complexing agent being isoquinoline, triethylamine, tributylamine, trihexylamine, diethylbutylamine, m-dioxane, p-dioxane, 2-methylpyridine, 4-methyl-pyridine, 2-methyl-4-butylpyridine, 3,5-dioctylpyridine, 2-methyl-5-butylpyridine, or triethylenediamine.

EXAMPLE IX

The invention is further demonstrated by charging 11.44 g (0.039 moles) of a 1:1 molar complex of aluminum tributyl and 4-methylpyridine and 18.5 g (0.176 moles) of $SiF_4$ to a 100 ml stainless steel autoclave. The autoclave was heated with stirring under an argon atmosphere for 1 hour at 125°C and 1.25 hours at 145°C. The liquid reaction product weighed 15.06 g and had the following composition by GC analysis (peak areas):

| | |
|---|---|
| $C_4H_9SiF_3$ | 94.0% |
| $(C_4H_9)_2SiF_2$ | 2.4% |
| $(C_4H_9)_3SiF$ | .2% |
| Other | 3.4% |

The conversion of aluminum tributyl to butyltrifluorosilane was about 82%.

This reaction product is then reacted with a 2:1 molar complex of isoquinoline and aluminum trioctyl in the manner described in Example IV to produce butyl(octyl)difluorosilane, the mole ratio of butyltrifluorosilane to aluminum trioctyl being 1/1.

EXAMPLE X

The procedure of Example IX is followed but using 13.31 g (0.046 moles) of a 1:1 molar complex of aluminum tributyl and 2-methylpyridine and 19.7 g (0.189 moles) of $SiF_4$ and heating for 1 hour at 125°C followed by 1.25 hours at 145°C. The liquid reaction product weighed 18.58 g and had the following composition by GC analysis (peak areas):

| | |
|---|---|
| $C_4H_9SiF_3$ | 90.0% |
| $(C_4H_9)_2SiF_2$ | 4.5% |
| $(C_4H_9)_3SiF$ | 0.2% |
| Other | 5.3% |

The conversion of aluminum tributyl to butyltrifluorosilane was about 83%.

This reaction product is then reacted with a 1:1 molar complex of 2-methyl-4-butylpyridine and aluminum tridodecyl in the manner described in Example IV to produce butyl(dodecyl)difluorosilane, the mole ratio of butyltrifluorosilane to aluminum tridodecyl being 0.25:1.

Having thus described the invention in detail it will be understood by those skilled in the art that certain variations and modifications may be made without departing from the spirit and scope of the invention as defined herein and in the appended claims.

We claim:

1. A method for producing dialkyldifluorosilanes comprising
   a. forming a reaction mixture of $SiF_4$ and an aluminum trialkyl complex, said reaction mixture having a molar ratio of $SiF_4$ to aluminum trialkyl content in the complex of at least 3; said aluminum trialkyl complex being derived from the addition of a complexing agent to aluminum trialkyl in a molar ratio of 0.4–3/1, respectively; said aluminum trialkyl being defined by $Al(R)_3$ wherein each R is an alkyl group containing 3 to 20 carbon atoms; said complexing agent being tetrahydrofuran; m-dioxane; p-dioxane; triethylenediamine; quinoline; isoquinoline; aliphatic amines of the formula

wherein each A is a straight chain alkyl group having 1 to 6 carbon atoms; or cyclic amines of the formula

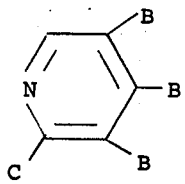

wherein C is hydrogen or methyl, and each B is hydrogen or an alkyl group having 1 to 10 carbon atoms provided that any two adjacent B groups together with the nuclear carbon atoms to which they are attached may represent a single ring having 5 to 7 carbon atoms;

b. subjecting said reaction mixture to reaction at temperatures in the range of 25° to 300°C at pressures of atmospheric to 3000 psi under a substantially anhydrous and oxygen-free atmosphere to form an alkyltrifluorosilane having the formula $RSiF_3$ wherein R is as defined in (a);

c. forming a reaction mixture of the alkyltrifluorosilane of step (b) and an aluminum trialkyl complex or aluminum trialkyl, said reaction mixture having a molar ratio of alkyltrifluorosilane to aluminum trialkyl in the range of 1:0.25–1; said aluminum trialkyl being defined by $Al(R')_3$ wherein each R' is an alkyl group containing 2 to 20 carbon atoms; said aluminum trialkyl complex being derived from the addition of a complexing agent to the above aluminum trialkyl in a molar ratio of 0.4–3:1, said complexing agent being tetrahydrofuran; m-dioxane; p-dioxane; triethylenediamine; quinoline; isoquinoline; aliphatic amines of the formula

wherein each A is a straight chain alkyl group having 1 to 6 carbon atoms; or cyclic amines of the formula

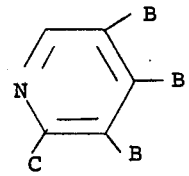

wherein C is hydrogen or methyl, and each B is hydrogen or an alkyl group having 1 to 10 carbon atoms provided that any two adjacent B groups together with the nuclear carbon atoms to which they are attached may represent a single ring having 5 to 7 carbon atoms;

d. subjecting the reaction mixture of step (c) to reaction at temperatures in the range of 180° to 300°C at pressures of atmospheric to 3000 psi under a substantially anhydrous and oxygen-free atmosphere to form a dialkyldifluorosilane having the formula $R(R')SiF_2$ wherein R is as defined in (a) and R' is as defined in (c); and e. recovering the dialkyldifluorosilane.

2. The method of claim 1 wherein said $SiF_4$ and said aluminum trialkyl content in the complex are present in a molar ratio in the range of from about 3:1 to 6:1 in step (a); and step (b) is carried out at a temperature of from about 100° to 255°C in the presence of an inert gas selected from the group consisting of argon, nitrogen, and mixtures of same for a period of time from about 1 to about 4 hours.

3. The method of claim 2 wherein R contains from about 4 to 12 carbon atoms.

4. The method of claim 2 wherein said complexing agent is present in step (a) in about a 1:1 molar ratio with said aluminum trialkyl and said complexing agent is selected from the group consisting of pyridine; isoquinoline; 2-methylpyridine; trimethyl amine; triethyl amine; 4-methylpyridine; m-dioxane; p-dioxane; tetrahydrofuran and triethylenediamine.

5. The method of claim 4 wherein said complexing agent is pyridine.

6. The method of claim 1 wherein said alkyltrifluorosilane compound and said aluminum trialkyl are present in a molar ratio of from about 1:0.35 to 1:0.7 in step (c) and step (d) is carried out at a temperature in the range of from about 200° to 260°C in the presence of an inert gas selected from the group consisting of argon, nitrogen and mixtures of same for a period of time of from about 1.5 to 4 hours.

7. The method of claim 6 wherein R' contains from about 2 to 12 carbon atoms.

* * * * *